3,182,096
DIMERISATION OF PROPYLENE
Alan Arthur Yeo and James Keith Hambling, Sunbury-on-Thames, England, assignors to The British Petroleum Company Limited, London, England, a British joint-stock corporation
No Drawing. Filed Aug. 29, 1961, Ser. No. 134,559
Claims priority, application Great Britain, Sept. 2, 1960, 30,331/60
7 Claims. (Cl. 260—683.15)

This invention relates to a process for the polymerisation of unsaturated compounds, particularly unsaturated hydrocarbon compounds.

It is an object of this invention to provide a novel process for the polymerisation of unsaturated compounds. It is a further object to provide a process for the production of 4-methylpentene-1 by the dimerisation of propylene.

According to this invention there is provided a process which comprises polymerising an unsaturated compound in the presence of a catalyst consisting of a compound of general formula A—MR$^1$R$^2$R$^3$), where A is an alkali metal, M is zinc, cadmium, tin or lead and R$^1$, R$^2$ and R$^3$, being the same or different, are hydrocarbon radicals or hydrogen, in the absence of any other material the presence of which would promote or modify the polymerisation reaction to yield high molecular weight polymers.

Typical of such other materials are halides of a metal of Group IVa, Va or VIa of the Periodic Table according to Mendeléeff.

In the compound of formula A—(MR$^1$R$^2$R$^3$), A, being an alkali metal, may be lithium, sodium, potassium, rubidium or caesium. Preferably A is potassium or rubidium. Preferably M is zinc or cadmium. The groups R$^1$, R$^2$ and R$^3$ are preferably all the same; if desired, however, two groups may be different from the third, being themselves the same, or all three groups may be different. The preferred hydrocarbon groups are alkyl groups; other groups which may be employed are aryl groups, alkyl substituted aryl groups and aryl substituted alkyl groups. Suitable alkyl groups are saturated alkyl groups having 14 carbon atoms per group, that is the methyl, ethyl, propyl and butyl groups. However, longer chain alkyl groups will impart greater solubility in hydrocarbons and in some circumstances the use of compounds having these longer groups may be desirable.

Suitably the unsaturated organic compound is a hydrocarbon. Preferably the hydrocarbon is a mono- or poly-olefin. Preferably the hydrocarbon is an alpha-olefin. If desired, mixtures of unsaturated organic compounds may be employed as the polymerisation feedstock.

Preferred feedstocks are ethylene, propylene, isobutene, butadiene and isoprene. Propylene is a particularly preferred feedstock.

The polymerisation reaction is carried out at temperatures which may range from ambient temperatures and below to 180° C. For monoolefins the temperature of reaction should be about 160° C., whereas for dienes ambient temperatures or below are normally used.

Polymerisation pressure may be atmospheric or super-atmospheric.

Preferably the polymerisation is carried out under a combination of conditions of temperature and pressure which lead to the formation of low molecular weight polymers, for example, dimers. Thus, when propylene is employed as feedstock, the process may be carried out to yield predominantly a C$_6$ product which contains a high proportion of 4-methylpentene-1. Thus, the process of this invention may be operated for the recovery of 4-methylpentene-1 from the reaction product. Preferably a C$_6$ cut is isolated from the product by distillation, and 4-methylpentene-1 separately recovered therefrom.

The invention is illustrated but not limited by the following example.

*Example*

A solution was prepared from benzene (100 ml.) and zinc diethyl (29.6 g., 0.76 mole). To this stirred solution, and under an atmosphere of pure dry nitrogen, was added potassium metal (6.25 g., 0.16 g. atom). The stirred solution was heated under reflux for one hour, and the benzene solution of the product separated from the metallic zinc residue by filtration. The benzene was removed to leave the solid catalyst.

The catalyst was charged to a one litre rocking autoclave which was heated to 160° C. and then pressured to 1500 lbs./sq. in gauge with pure dry propylene. The temperature was held at 160° C. throughout the reaction period of 20 hours, at the end of which time the pressure had fallen to 900 lbs./sq. in. gauge.

The products were distilled from the autoclave and the unreacted propylene was removed by evaporation. The yield of hexenes obtained from the residue by distillation was 150 grams (1.8 moles) and comprised 94% of the reacted propylene.

The hexene fraction was analysed and found to contain:

| | Wt. percent |
|---|---|
| 4-methylpentene-1 | 57 |
| 4-methylpentene-2 | 36 |
| 2-methylpentene-1 | 1 |
| 2-methylpentene-2 | 3 |
| n-Hexenes | 3 |

We claim:
1. A process for the production of 4-methylpentene-1, comprising: dimerising propylene in the presence of a catalyst which consists essentially of a compound of general formula A—(MR$^1$R$^2$R$^3$), where A is an alkali metal, M is selected from the group consisting of zinc, cadmium, lead and tin, and R$^1$, R$^2$, and R$^3$ are selected from the group consisting of hydrocarbon radicals and hydrogen.
2. The process of claim 1, wherein A is potassium.
3. The process of claim 1, wherein A is rubidium.
4. The process of claim 1, wherein the hydrocarbon radicals R$^1$, R$^2$ and R$^3$ are selected from the group consisting of alkyl, aryl, alkaryl and aralkyl radicals.
5. The process of claim 1, wherein R$^1$, R$^2$ and R$^3$ are the same.
6. The process of claim 1, wherein the catalyst consists of potassium zinc triethyl.
7. The process of claim 1, wherein the reaction temperature is about 160° C.

References Cited by the Examiner

UNITED STATES PATENTS

| 2,117,022 | 5/38 | Cramer | 260—683.15 |
| 2,401,922 | 6/46 | Frey et al. | 260—683.15 |
| 2,450,451 | 10/48 | Schmerling | 260—683.15 |
| 2,695,327 | 11/54 | Ziegler et al. | 260—683.15 |
| 2,881,234 | 4/59 | Esmay et al. | 260—683.15 |
| 2,986,588 | 5/61 | Schramm | 260—683.15 |
| 3,009,972 | 11/61 | Johnson | 260—683.15 |

ALPHONSO D. SULLIVAN, *Primary Examiner.*
PAUL M. COUGHLAN, *Examiner.*

UNITED STATES PATENT OFFICE
CERTIFICATE OF CORRECTION

Patetent No. 3,182,096

May 4, 1965

Alan Arthur Yeo et al.

It is hereby certified that error appears in the above numbered patent requiring correction and that the said Letters Patent should read as corrected below.

Column 1, line 42, for "14 carbon atoms" read -- 1-4 carbon atoms --.

Signed and sealed this 28th day of September 1965.

(SEAL)
Attest:

ERNEST W. SWIDER
Attesting Officer

EDWARD J. BRENNER
Commissioner of Patents